Patented Sept. 12, 1950

2,521,944

UNITED STATES PATENT OFFICE 2,521,944

POLYMETHINE DYES AND PROCESS OF PREPARATION

Valerie P. Pittman, Harrow, Middlesex, England, assignor to Eastman Kodak Company, Rochester, N. Y., a corporation of New Jersey No Drawing. Application November 22, 1947, Serial No. 787,619

14 Claims. (Cl. 260—240.1)

This invention relates to polymethine dyes containing four auxochromic nitrogen atoms and to a process for preparing such dyes.

Heilbron, Beattie, and Irving have shown that polymethine dyes, or more specifically polymethine dyes of the dicarbocyanine type, having a nitro, chloro, or bromo group on the meso carbon atom of the polymethine chain can be prepared by condensing a cyclammonium quaternary salt containing a reactive methyl group with the anils of nitro-, chloro-, or bromomalonic dialdehydes. Jour. Chem. Soc., 1932, 260. Piggott and Rodd have shown that similar unsubstituted dicarbocyanines can be prepared by condensing a cycloammonium quaternary salt containing a reactive methyl group with β-anilinoacrolein anil hydrochloride. British Patent 355,693, dated August 24, 1931.

While the dicarbocyanine dyes heretofore prepared contain only one pentamethine chain, we have now found that it is possible to prepare new complex dicarbocyanine dyes containing two pentamethine chains, the chains being connected by a bond and each chain being terminated by a heterocyclic group containing an auxochromic nitrogen atom. I have further found that these new complex dicarbocyanine dyes are useful as sensitizers for photographic emulsions.

It is accordingly an object of my invention to provide new complex dicarbocyanine dyes. A further object of my invention is to provide a process for preparing such dyes. A further object is to provide photographic emulsions sensitized with such dyes. Other objects will become apparent hereinafter.

In accordance with the process of my invention, I prepare the new complex carbocyanine dyes by condensing a cycloammonium quaternary salt containing a reactive methyl group with a β-formyl-β-halogenoacrylic acid containing in the α-position an ionisable group other than a halogen atom.

The cyclammonium quaternary salts containing a reactive methyl group which can be used in practicing my invention can be represented by the formula:

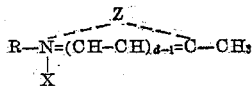

wherein R represents an alkyl group, such as methyl, ethyl, n-propyl, n-butyl, isobutyl, etc. (e. g., a primary alkyl group having the formula $C_nH_{2n+1}$ wherein $n$ is a positive integer from 1 to 4), $d$ represents a positive integer of from 1 to 2, Z represents the nonmetallic atoms necessary to complete a heterocyclic nucleus containing from 5 to 6 atoms in the heterocyclic ring, and X represents an anion, e. g., $Cl^-$, $Br^-$, $I^-$, $ClO_4^-$, $NO_3^-$, $CH_3SO_4^-$, $C_2H_5SO_4^-$, $C_6H_5SO_3^-$ $p-CH_3C_6H_4SO_3^-$, $CH_3COO^-$, $C_2H_5COO^-$, $CN^-$, etc. Advantageously, I can use cyclammonium quaternary salts represented by the above formula wherein R is a primary alkyl group containing from 1 to 4 carbon atoms, and X is a halide ion. Typical cyclammonium quaternary salts containing a reactive methyl group which I employ in practicing my invention include those of the thiazole series (e. g. 2-methylthiazole ethiodide, 2,4-dimethylthiazole ethiodide, 2-methyl-4-(2-thienyl) thiazole ethiodide, 2-methyl-4-phenylthiazole ethiodide, etc.), those of the benzthiazole series (e. g. 2-methylbenzthiazole ethiodide, 5-chloro-2-methylbenzthiazole ethiodide, etc.), those of the benzbenzthiazole series (e. g. 2-methyl-4,5-benzbenzthiazole etho-p-toluenesulfonate, 2-methyl-6,7-benzbenzthiazole ethiodide etc.), those of the oxazole series (e. g. 2,4-dimethyloxazole ethiodide, 2 - methyl - 4 - phenyoxazole ethiodide, etc.), those of the benzoxazole series (e. g. 2-methylbenzoxazole ethiodide, etc.), those of the benzbenzoxazole series (e. g. 2-methyl-4,5-benzbenzoxazole ethiodide, 2-methyl-6,7-benzbenzoxazole ethiodide etc.), those of the thiazoline series (e. g. 2-methylthiazoline methiodide, etc.), those of the selenazole series (e. g. 2,4-dimethylselenazole ethiodide, 2-methyl-4-phenylselenazole ethiodide, etc.), those of the benzselenazole series (e. g. 2-methylbenzselenazole ethiodide, 5 - chloro - 2 - methylbenzselenazole ethiodide, etc.), those of 3,3-dimethylindolenine series (e. g. 2,3,3-trimethylindolenine methiodide, etc.), those of the quinoline series (e. g. quinaldine ethiodide, quinaldine n-butobromide, 6-ethoxyquinaldine ethiodide, 6-methylquinaldine methiodide, lepidine n-butobromide, etc.), etc.

The β-formyl-β-haloacrylic acids which can be used in practicing my invention can be represented by the formula:

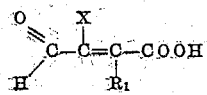

wherein $R_1$ represents a member selected from the group consisting of a hydroxyl group, a phenoxyl ($C_6H_5O^-$) group, and an alkoxyl group, e. g. methoxy, ethoxy, etc., and X represents a halogen atom such as chlorine or bromine. Advantageously I can use an acid represented by the above formula wherein X represents a chlorine atom and R₁ represents a phenoxyl group (e. g., β-formyl-β-chloro-α-phenoxyacrylic or "mucophenoxychloric" acid).

The condensations are advantageously effected in the presence of an acid-binding agent. Strong tertiary organic bases, i. e., tertiary organic bases having dissociation constants substantially greater than that of pyridine, are especially suitable. The trialkylamines, e. g., triethylamine, tri-n-propylamine, tri-n-butylamine, etc., and N-alkyl piperidines, e. g., N-methylpiperidine, N-ethylpiperidine, etc., have been found to be especially useful. Ordinarily the tertiary base is employed in alcohol or in pyridine solution.

The following examples will serve to characterize further the manner of practicing my invention:

*Example I.—Condensation of β-formyl-β-chloro-α-phenoxyacrylic (mucophenoxychloric) acid with quinaldine ethiodide*

A warm suspension of 1.13 gms. (1 mol) of β-formyl-β-chloro-α-phenoxyacrylic acid, and 2.99 gms. (2 mols) of quinaldine ethiodide in 10 cc. of ethyl alcohol was prepared, and 1.4 cc. (2 mols) of triethylamine slowly added with stirring. A vigorous reaction occurred almost immediately, copious quantities of carbon dioxide were evolved, and the suspension turned a deep green color. After all of the quinaldine ethiodide had gone into solution, the reaction mixture was chilled. A small quantity of dye separated out, but on pouring the chilled mixture into 100 cc. of water, still more dye precipitated out of solution. The mixture was then filtered, and the bronze crystals so obtained dried. The dye was recrystallized from methyl alcohol (70 cc. per gm. of dye), and 0.8 gm. (yield—16%) of a dye in the form of shining green crystals, having the formula:

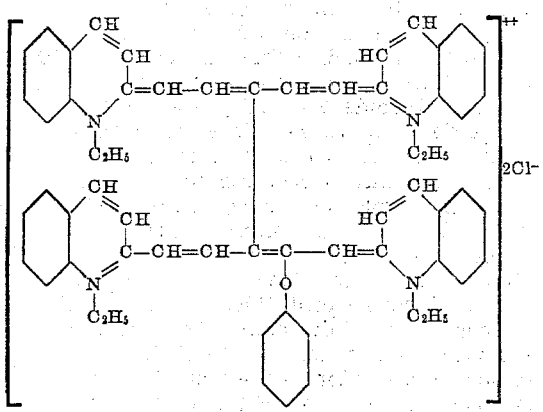

were obtained.

*Example II.—Condensation of β-formyl-β-chloro-α-phenoxyacrylic (mucophenoxychloric) acid with 2-methylbenzthiazole ethiodide*

A warm suspension of 2.26 gms. (1 mol) of β-formyl-β-chloro-α-phenoxyacrylic acid and 7.1 gms. (2 mols) of 2-methylbenzthiazole ethiodide in 10 cc. of ethyl alcohol was prepared. 2.8 cc. (2 mols) of triethylamine were then slowly added with stirring. A vigorous reaction took place almost immediately, copious quantities of gaseous carbon dioxide were evolved, and the reaction mixture took on a deep green color. The reaction mixture was then chilled, and 30 cc. of diethyl ether added. The resulting dark green precipitate was then filtered off, and washed with water and a small quantity of cold methyl alcohol. On recrystallization from 90 cc. of methyl alcohol, a yield of 3.6 gms. (60% yield) of shining blue crystals having the formula:

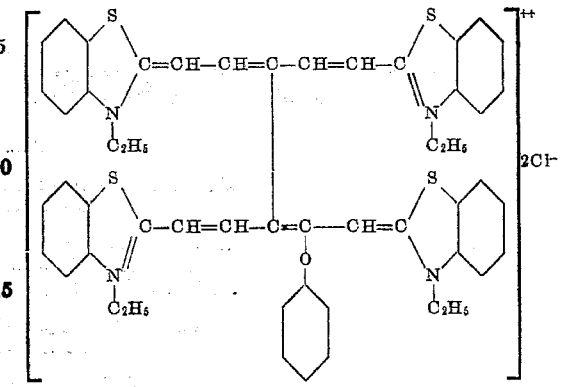

was obtained. It was found to sensitize a fast negative silver bromide emulsion with a maximum effect lying at 695 mµ. In a similar process in which a molecularly equivalent amount of 2-methylbenzthiazole ethochloride replaced the 2-methylbenzthiazole ethiodide, the same dye was obtained as shining blue crystals which exhibited similar sensitizing properties.

*Example III.—Condensation of β-formyl-β-chloro-α-phenoxyacrylic (mucophenoxychloric) acid with 5-chloro-2-methylbenzthiazole ethiodide*

A warm suspension of 1.13 gms. (1 mol) of β-formyl-β-chloro-α-phenoxyacrylic acid and 3.4 gms. (2 mols) of 5-chloro-2-methylbenzthiazole ethiodide in 5 cc. of ethyl alcohol was prepared and 1.4 cc. (2 mols) of triethylamine slowly added. A vigorous evolution of carbon dioxide occurred almost immediately, and a deep blue color formed in the suspension. Within a few seconds a copious precipitate of green dye was formed, and the precipitate filtered off from the liquid residue, after the mixture had been thoroughly chilled. The resulting dye was then washed with cold water and cold ethyl alcohol, and recrystallized twice from methyl alcohol (370 cc. per gm. of dye). Operating in this manner, 1.2 gms., representing a 45% yield, of a pure dye having the formula:

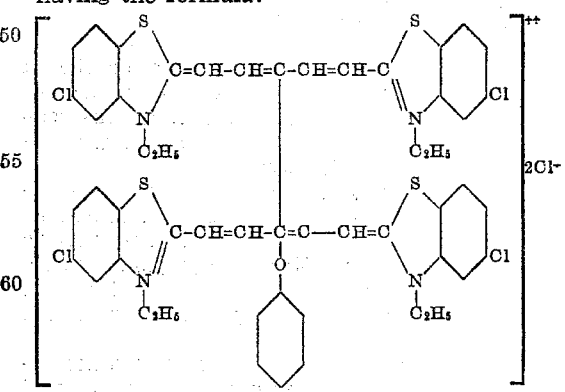

were obtained. An identical dye was obtained when a molecularly equivalent amount of 5-chloro-2-methylbenzthiazole ethochloride is substituted for its corresponding ethiodide. Both dyes were found to be capable of sensitizing a fast negative silver bromide emulson with a maximum effect at 695 mµ.

By substituting molecularly equivalent amounts of β-formyl-β-chloro-α-hydroxyacrylic acid, β-formyl-β-bromo-α-ethoxyacrylic acid, etc., in the above example, other dyes can be prepared.

*Example IV.—Condensation of β-formyl-β-chloro-α-phenoxyacrylic (mucophenoxychloric) acid with 2-methylbenzselenazole ethiodide*

A hot suspension of 1.13 gms. (1 mol) of β-formyl-β-chloro-α-phenoxyacrylic acid and 3.52 gms. (2 mols) of 2-methylbenzselenazole ethiodide in 5 cc. of ethyl alcohol was prepared, and 1.4 cc. (2 mols) of triethylamine slowly added. A vigorous reaction occurred almost immediately with the evolution of carbon dioxide and the formation of a deep green color in the suspension. The reaction mixture was allowed to stand for one hour at room temperature, and a copious precipitate of shining green crystals separated out on chilling. These were filtered off, and washed successively with water and cold ethyl alcohol. On recrystallizing from 1800 cc. of methyl alcohol, 1.8 gms., representing a yield of 32%, of a pure dye having the formula:

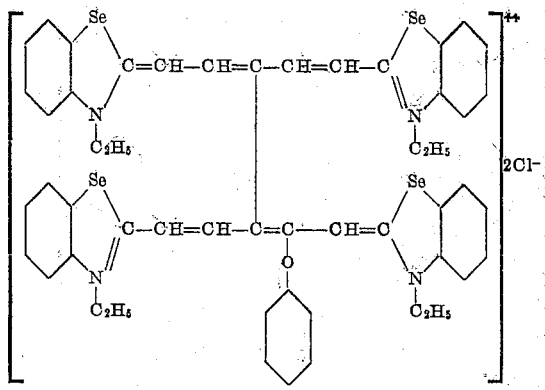

were obtained.

*Example V.—Condensation of β-formyl-β-chloro-α-phenoxyacrylic (mucophenoxychloric) acid and 2-methyl-4,5-benzbenzthiazole etho-p-toluenesulfonate*

A warm suspension of 2.27 gms. (1 mol) of β-formyl-β-chloro-α-phenoxyacrylic acid and 7.98 gms. (2 mols) of 2-methyl-4,5-benzbenzthiazole etho-p-toluenesulfonate in 15 cc. of ethyl alcohol, and 2.8 cc. (2 mols) of triethylamine added. The reaction mixture was then left at room temperature for a period of one hour with occasional stirring. A green color gradually developed and shining green crystals separated out. After chilling, the resulting precipitate is filtered off, and then washed with water and cold ethyl alcohol. On recrystallization from 950 cc. of methyl alcohol, 1.3 gms., representing a yield of 11%, of pure dye having the formula:

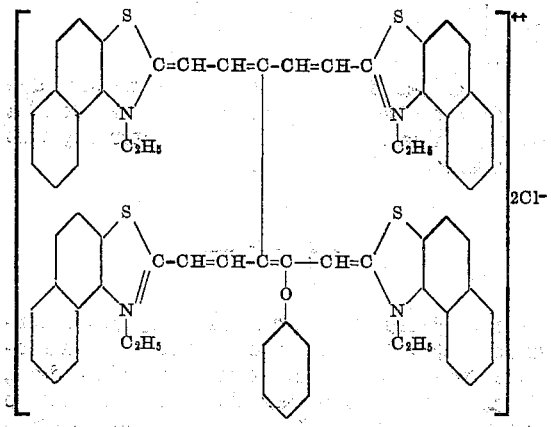

were obtained.

Operating in a similar manner, but using a molecularly equivalent amount of 2-methyl-4,5-benzbenzthiazole ethiodide in place of its corresponding etho-p-toluenesulfonate, the identical dye was obtained.

In the above examples, the quinaldine ethiodide, 2-methylbenzthiazole ethiodide, 2-methylbenzselenazole ethiodide, 5-chloro-2-methylbenzthiazole ethiodide and 2-methyl-4,5-benzbenzthiazole etho-p-toluenesulfonate can be replaced with molecularly equivalent amounts of 2-methyl-benzoxazole ethiodide, 2-methyl-4,5-benzbenzoxazole ethiodide, 2-methyl-thiazoline methiodide, 2-methyl-4-phenylthiazole ethiodide, 2,4-dimethylthiazole ethiodide, etc. Moreover, the β-formyl-β-chloro-α-phenoxyacrylic acid can be replaced with molecularly equivalent amounts of β-formyl-β-chloro-α-hydroxyacrylic acid, β-formyl-β-chloro-α-ethoxyacrylic acid, β-formyl-β-bromo-α-phenoxyacrylic acid, β-formyl-β-bromo-α-hydroxyacrylic acid, β-formyl-β-bromo-α-ethoxyacrylic acid, etc.

The spirit (ethyl alcohol) solution of all the sensitizing dyes of the above examples are of the typical blue dicarbocyanine color.

In each of the above examples the β-formyl-β-chloro-α-phenoxyacrylic acid results in the formation of the chloride of my new complex carbocyanine dyes. To obtain the iodide, bromide, or perchlorate salts, a hot alcoholic solution of the carbocyanine chloride salt is treated with a concentrated aqueous solution of potassium iodide, potassium bromide, or sodium perchlorate.

In the preparation of photographic emulsions containing my new dyes, it is only necessary to disperse the dyes in the emulsions. The methods of incorporating dyes in emulsions are simple and well known to those skilled in the art. It is convenient to add the dyes from solutions in appropriate solvents. Methanol has proved satisfactory as a solvent for my new dyes. Ethyl alcohol or acetone may also be employed where the solubility of the dyes in methanol is lower than desired.

Sensitization by means of my new dyes is, of course, directed primarily to the ordinarily employed gelatino-silver-halide developing-out emulsions. The dyes are advantageously incorporated in the washed, finished emulsions and should, of course, be uniformly distributed throughout the emulsions.

The concentration of my new dyes in the emulsion can vary widely, i. e. from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of my new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of my new dyes, 10 to 20 mgs. of dye per liter of emulsion suffices to produce the maximum sensitizing effect with the ordinary gelatinosilver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting my invention in any sense, as it will be apparent that my new dyes can be incorporated by other methods in many of the photographic silver halide emulsions customarily employed in the art. For instance, the dyes may be incorporated by bathing a plate or film upon which an emulsion has been coated, in the solution of the dye, in an appropriate solvent. Bathing methods, however, are not to be preferred ordinarily.

I claim:

1. A process for preparing a polymethine dye which comprises condensing in the presence of a trialkylamine, a cyclammonium quaternary salt represented by the formula:

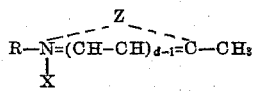

wherein R represents an alkyl group of the formula $C_nH_{2n+1}$ wherein $n$ represents a positive integer from 1 to 4, X represents an acid radical, Z represents the non-metallic atoms necessary to complete a heterocyclic nucleus of a member selected from the group consisting of those of the thiazole series, the benzthiazole series, the benzbenzthiazole series, the oxazole series, the benzoxazole series, the benzbenzoxazole series, the thiazoline series, the selenazole series, the benzselenazole series, the 3,3-dimethylindolenine series, and the quinoline series, and $d$ represents a positive integer from 1 to 2, with an acid represented by the formula:

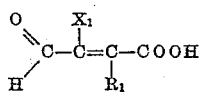

wherein $X_1$ represents a halogen atom and $R_1$ represents a phenoxyl group.

2. A polymethine dye represented by the formula:

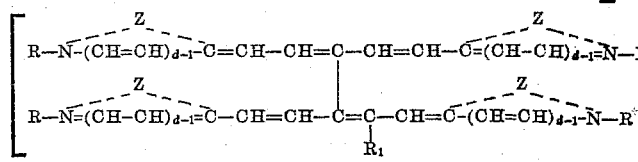

wherein R represents an alkyl group of the formula $C_nH_{2n+1}$ wherein $n$ represents a positive integer from 1 to 4, $R_1$ represents a phenoxyl group, Z represents the non-metallic atoms necessary to complete a heterocyclic nucleus of a member selected from the group consisting of those of the thiazole series, the benzthiazole series, the benzbenzthiazole series, the oxazole series, the benzoxazole series, the benzbenzoxazole series, the thiazoline series, the selenazole series, benzselenazole series, the 3,3-dimethylindolenine series, and the quinoline series, $d$ represents a positive integer from 1 to 2, and X represents a halogen atom having an atomic weight between 35 and 127.

3. A polymethine dye represented by the formula:

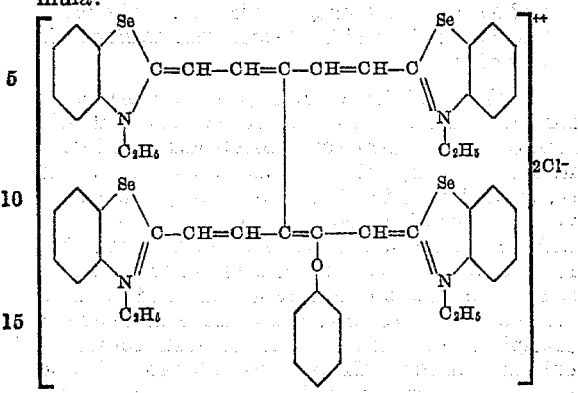

4. A polymethine dye represented by the formula:

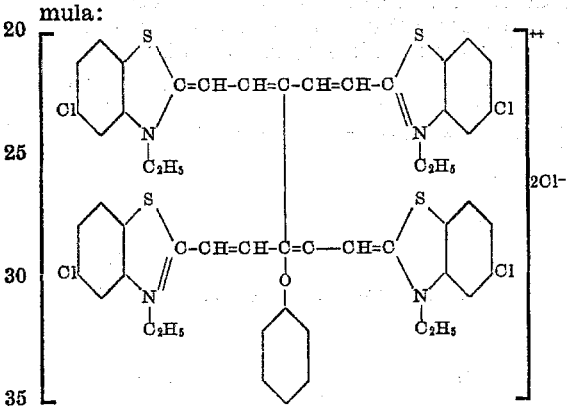

5. A polymethine dye represented by the formula:

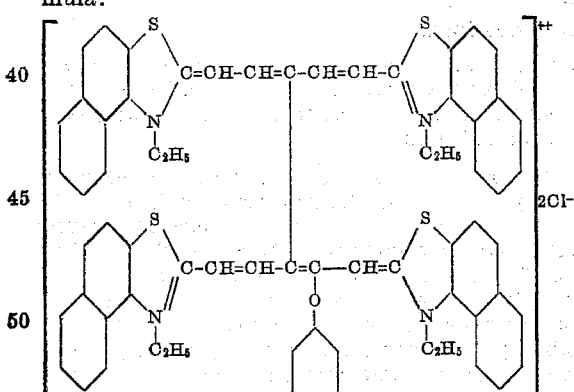

6. A process for preparing a polymethine dye which comprises condensing in the presence of a trialkylamine a cyclammonium quaternary salt represented by the formula:

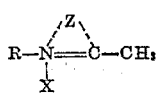

wherein R represents an alkyl group of the formula $C_nH_{2n+1}$ wherein $n$ represents a positive integer from 1 to 4, X represents an acid radical, Z represents the non-metallic atoms necessary to complete a heterocyclic nucleus of the benzselenazole series, with an acid represented by the formula:

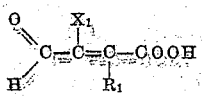

wherein $X_1$ represents a halogen atom and $R_1$ represents a phenoxyl group.

7. A process for preparing a polymethine dye which comprises condensing in the presence of a trialkylamine a cyclammonium quaternary salt represented by the formula:

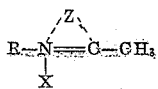

wherein R represents an alkyl group of the formula $C_nH_{2n+1}$ wherein $n$ represents a positive integer from 1 to 4, X represents an acid radical, Z represents the non-metallic atoms necessary to complete a heterocyclic nucleus of the benzthiazole series, with an acid represented by the formula:

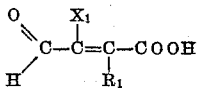

wherein $X_1$ represents a halogen atom and $R_1$ represents a phenoxyl group.

8. A process for preparing a polymethine dye which comprises condensing in the presence of a trialkylamine a cyclammonium quaternary salt represented by the formula:

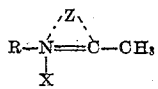

wherein R represents an alkyl group of the formula $C_nH_{2n+1}$ wherein $n$ represents a positive integer from 1 to 4, X represents an acid radical, Z represents the non-metallic atoms necessary to complete a heterocyclic nucleus of the benzbenzthiazole series, with an acid represented by the formula:

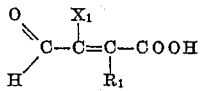

wherein $X_1$ represents a halogen atom and $R_1$ represents a phenoxyl group.

9. A process for preparing a polymethine dye which comprises condensing in the presence of triethylamine a cyclammonium quaternary salt represented by the formula:

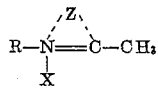

wherein R represents an alkyl group of the formula $C_nH_{2n+1}$ wherein $n$ represents a positive integer from 1 to 4, X represents a halogen atom and Z represents the non-metallic atoms necessary to complete a heterocyclic nucleus of the benzselenazole series, with an acid represented by the formula:

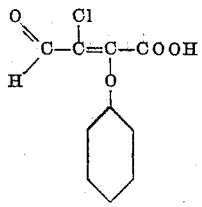

10. A process for preparing a polymethine dye which comprises condensing in the presence of triethylamine a cyclammonium quaternary salt represented by the formula:

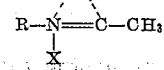

wherein R represents an alkyl group of the formula $C_nH_{2n+1}$ wherein $n$ represents a positive integer from 1 to 4, X represents a halogen atom and Z represents the non-metallic atoms necessary to complete a heterocyclic nucleus of the benzthiazole series, with an acid represented by the formula:

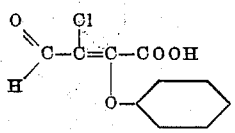

11. A process for preparing a polymethine dye which comprises condensing in the presence of triethylamine a cyclammonium quaternary salt represented by the formula:

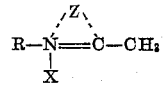

wherein R represents an alkyl group of the formula $C_nH_{2n+1}$ wherein $n$ represents a positive integer from 1 to 4, X represents a halogen atom and Z represents the non-metallic atoms necessary to complete a heterocyclic nucleus of the benzbenzthiazole series, with an acid represented by the formula:

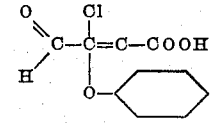

12. A polymethine dye represented by the formula:

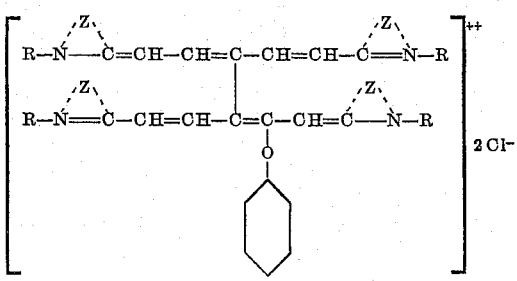

wherein R represents an alkyl group of the formula $C_nH_{2n+1}$ wherein $n$ represents a positive integer from 1 to 4 and Z represents the non-metallic atoms necessary to complete a heterocyclic nucleus of the benzselenazole series.

13. A polymethine dye represented by the formula:

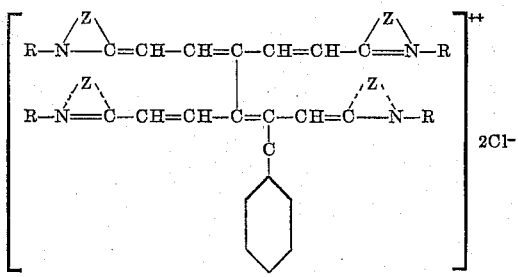

wherein R represents an alkyl group of the formula $C_nH_{2n+1}$ wherein $n$ represents a positive integer from 1 to 4 and Z represents the nonmetallic atoms necessary to complete a heterocyclic nucleus of the benzthiazole series.

14. A polymethine dye represented by the formula:

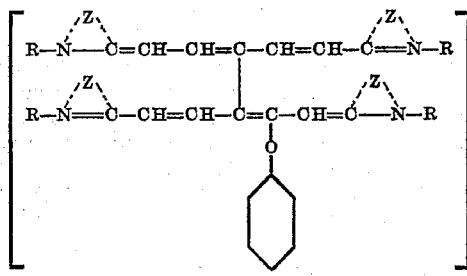

wherein R represents an alkyl group of the formula $C_nH_{2n+1}$ wherein $n$ represents a positive integer from 1 to 4 and Z represents the nonmetallic atoms necessary to complete a heterocyclic nucleus of the benzbenzthiazole series.

VALERIE P. PITTMAN.

REFERENCES CITED

The following references are of record in the file of this patent:

UNITED STATES PATENTS

| Number | Name | Date |
|---|---|---|
| 2,111,183 | Heilbron | Mar. 15, 1938 |

Certificate of Correction

Patent No. 2,521,944 September 12, 1950

VALERIE P. PITTMAN

It is hereby certified that error appears in the printed specification of the above numbered patent requiring correction as follows:

Column 2, line 25, for "phenyoxazole" read *phenyloxazole*; column 4, lines 58 to 64, for that portion of the formula reading

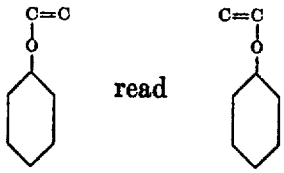 read line 70, for "emulson" read *emulsion*; column 8, lines 29 to 35, for

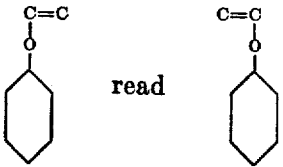 read column 10, lines 61 to 63, for that portion of the formula reading

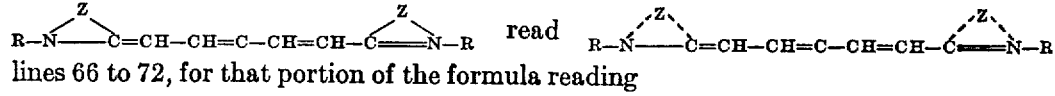

lines 66 to 72, for that portion of the formula reading

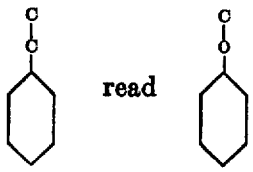 read and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*